(12) United States Patent
Coulter et al.

(10) Patent No.: US 6,572,038 B2
(45) Date of Patent: Jun. 3, 2003

(54) MACHINE FOR SHREDDING COMPACTED FIBROUS MATERIAL AND PNEUMATICALLY CONVEYING RESULTANT SHREDDED MATERIALS

(75) Inventors: Jack D. Coulter, Winter Haven, FL (US); Robert A. Wright, Auburndale, FL (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/901,189

(22) Filed: Jul. 9, 2001

(65) Prior Publication Data

US 2003/0025019 A1 Feb. 6, 2003

(51) Int. Cl.[7] .......................... B02C 19/12; B02C 23/18
(52) U.S. Cl. ................... 241/47; 241/101.2; 241/285.2; 241/285.3
(58) Field of Search ........................ 241/236, 47, 154, 241/285.2, 285.3, 101.2, 186.5

(56) References Cited

U.S. PATENT DOCUMENTS

| | | | | |
|---|---|---|---|---|
| 3,529,870 A | * | 9/1970 | Woten | 406/53 |
| 4,205,795 A | * | 6/1980 | Graveman | 241/101.74 |
| 4,261,523 A | * | 4/1981 | LaPointe | 241/224 |
| 4,411,390 A | * | 10/1983 | Woten | 241/98 |
| 4,662,221 A | * | 5/1987 | Kaine et al. | 73/599 |
| 6,161,784 A | * | 12/2000 | Horton | 239/654 |

\* cited by examiner

Primary Examiner—John M. Husar
(74) Attorney, Agent, or Firm—Stevens, Davis, Miller & Mosher, LLP

(57) ABSTRACT

A machine for separating a compacted fibrous material and pneumatically impelling separated fibrous material generally comprising a hopper having a trough at a lower end thereof provided with an outlet, a pair of augers disposed in the trough operable to advance separated fibrous material toward and into the hopper outlet, means disposed in the hopper between an inlet of the hopper and the trough for shredding compacted fibrous materials introduced into the hopper, an airlock feeder having an inlet communicating with the trough outlet, a motor and means for conveying drive from the motor to the shredding means, the augers and the feeder.

40 Claims, 4 Drawing Sheets

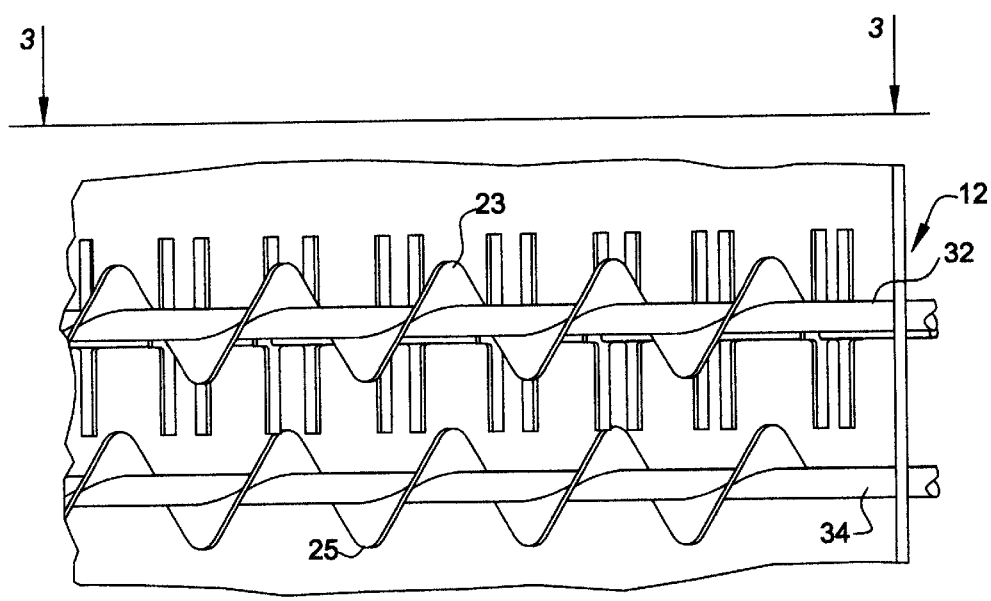
FIG. 2
FIG. 3
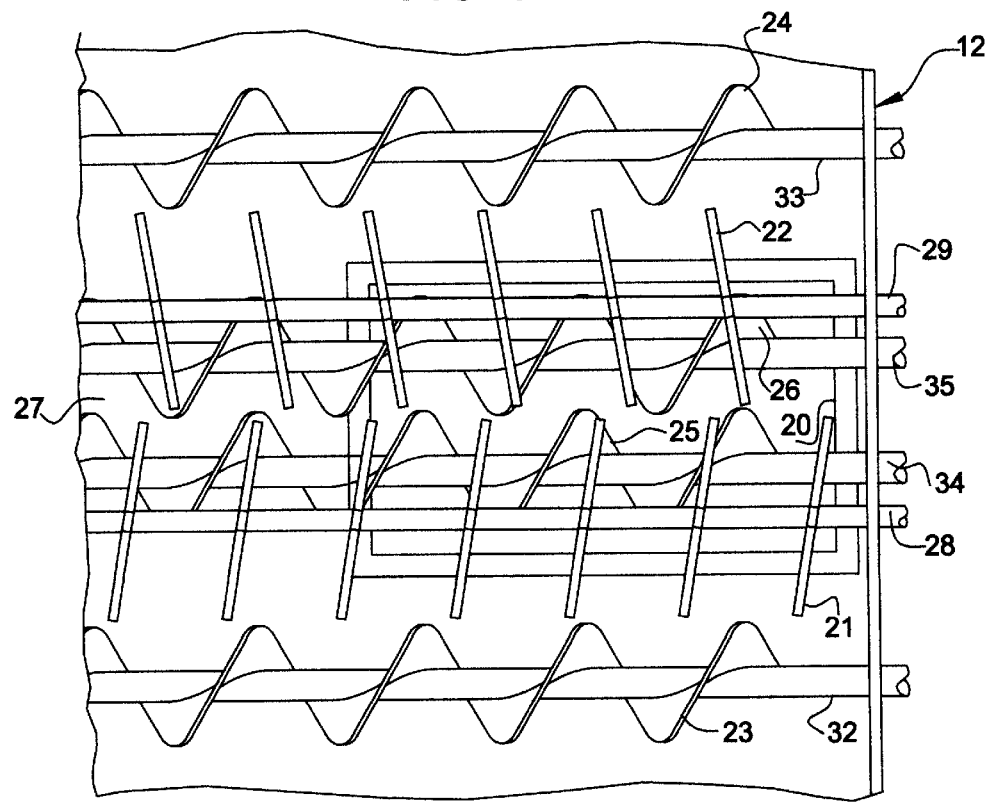

MACHINE FOR SHREDDING COMPACTED FIBROUS MATERIAL AND PNEUMATICALLY CONVEYING RESULTANT SHREDDED MATERIALS

This invention relates to an improved machine for shredding a compacted fibrous material and pneumatically conveying the resultant shredded material for various purposes such as applying fibrous insulating materials onto the interior walls of building structures. This invention further contemplates an improved feeder for such a machine.

BACKGROUND OF THE INVENTION

In the prior art, there has been developed a type of machine for shredding compacted fibrous materials and pneumatically conveying the resultant shredded materials which generally consists of a frame, a hopper mounted on such frame into which compacted fibrous materials may be introduced and means disposed in the hopper for shredding the compacted fibrous material and discharging the shredded material through an outlet into an airlock feeder. The shredding means typically consist of a pair of rotatable shafts provided with radially projecting arm members which engage and separate the compacted fibrous material. Augers also have been employed to advance the shredded material to the outlet of the hopper to be discharged into the airlock feeder. Such feeder typically has consisted of a housing provided with a rotor which functions to advance introduced fiber materials to a lower end of the housing where such material is impelled into a hose or other device by air under pressure introduced into the feeder. Examples of such machines are disclosed in U.S. Pat. Nos. 3,529,870 to Homer G. Wooten, 4,411,390 to Homer G. Wooten, 4,662,221 to Eugene Kaine et al.

In such machines, the feeder functions not only to convey shredded fibrous material from the hopper to a section of the feeder to be entrained in and conveyed by a stream of air under pressure but also to isolate the high pressure air stream injected through the feeder from the hopper which usually is at atmospheric pressure. To assure such isolation of the high pressure air stream, a seal is provided between the airlock and the hopper which periodically should be inspected and replaced to maintain the desired pressure of the air stream for suitably conveying the entrained fibrous materials.

Although such prior art machines have been suitable in shredding compacted fibrous materials and introducing them into a high pressure air stream, it has been found that such machines have not been entirely satisfactory in performance in that the feed rate of the shredded fibrous material introduced into the air stream has not been sufficient to produce a desired density of the shredded fibrous material entrained in the air stream and thus more efficiently convey such material. It further has been found that the design of such machines has not been conducive to readily detaching the feeders thereof to allow the removal of foreign matter from the feeders, or the inspection and replacement of the internal rotor seals of the feeders.

It thus is the principal object of the present invention to provide an improved machine of the type described and an improved feeder for such machine which overcomes the aforementioned shortcomings of such prior art machines.

SUMMARY OF THE INVENTION

The present invention provides an improved machine for separating a compacted fibrous material and pneumatically impelling separated fibrous material which generally comprises a hopper having a trough at a lower end thereof, such trough being provided with an outlet, a pair of augers disposed in the trough operable to advance separated fibrous material toward the outlet, means disposed in the hopper between an inlet of the hopper and the trough for shredding compacted fibrous material introduced into the hopper, an airlock feeder having an inlet communicating with the trough outlet, a motor and means for conveying drive from the motor to the shredding means, the augers and the feeder. Preferably, the hopper includes a pair of laterally spaced side walls converging toward the trough, the augers disposed in the trough are counter-rotating and the rotor of the feeder is provided with a plurality of circumferentially spaced pockets each communicable in a first position with the trough outlet for receiving separated fibrous material therefrom and communicable in a second position with an inlet of the feeder communicable with a source of air under pressure and with an outlet of the feeder. It further is preferred that the airlock feeder be displaceable between a first position wedged between an outlet portion of the hopper and an opposed surface, operable to receive and impel shredded fibrous material and a second position, detached from the hopper permitting a seal provided on the feeder surface and engagable with the hopper to be inspected and easily replaced. A manually operated mechanism further is provided for displacing the feeder between such first and second positions.

BRIEF DESCRIPTION OF THE DRAWINGS

FIG. 2 is an enlarged view taken along lines 2—2 in FIG. 1, having portions thereof broken away;

FIG. 3 is a cross sectional view taken along lines 3—3 in FIG. 2;

DESCRIPTION OF THE PREFERRED EMBODIMENT OF THE INVENTION

Figure 1:
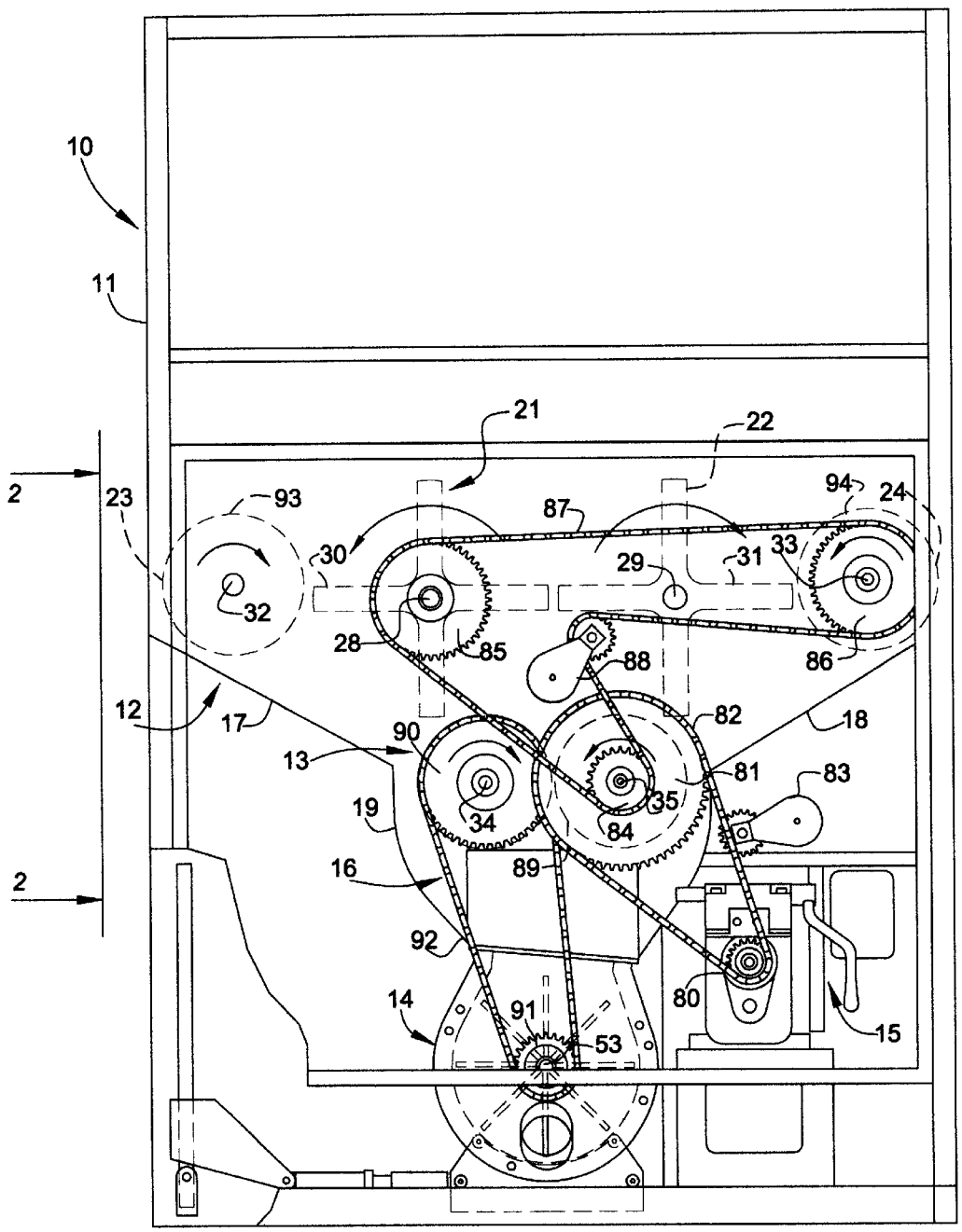
FIG. 1 is a front elevational view of an embodiment of the invention, having a portion thereof broken away.

Referring to the drawings, there is illustrated a machine 10 embodying the present invention which generally includes a frame 11, a hopper 12 mounted on the frame, a mechanical assembly 13 mounted in the hopper for shredding compacted fibrous materials introduced into the hopper and advancing and discharging them to and through an outlet in the hopper, airlock feeder 14 mounted on the frame and adapted to receive shredded fibrous material from the hopper and pneumatically impel such material entrained in an air stream through an outlet thereof, a motor 15 also mounted on the frame and a set 16 of gears and drive chains for transmitting drive from the motor to the various components of the mechanical assembly and the airlock feeder.

Hopper 12 includes a pair of substantially vertical end walls and a pair of side walls converging as at 17 and 18 at the lower ends thereof, terminating in a trough section 19.

The upper end of the hopper is open providing an inlet for introducing compacted fibrous material to be shredded by the machine, and the front end of the bottom wall of the trough is provided with an outlet 20 as best seen in FIG. 3. The function of mechanical assembly 13 is essentially to shred the material introduced through the hopper inlet, advance the shredded material toward the front end of the hopper and discharge it through the hopper outlet. The assembly includes a pair of counter rotating shredders 21 and 22 disposed in the upper, center region of the hopper, a first pair of augers 23 and 24 each disposed between a shredder and a side wall of the hopper and a second pair of augers 25 and 26 disposed between the set of shredders and a bottom wall 27 of the hopper containing outlet 20 at the front end thereof. Shredders 21 and 22 include a pair of longitudinally disposed, transversely spaced shafts 28 and 29 journaled in the end walls of the hopper and a plurality of longitudinally spaced sets 30 and 31 of radially projecting, material separating arm members 30 and 31. Auger 23 includes a longitudinally disposed shaft 32 disposed between shredder 21 and an end wall, and journaled in the end walls of the hopper. Similarly, auger 24 includes a longitudinally disposed shaft 33 disposed between shredder 22 and a side wall of the hopper and journaled in the end walls of the hopper. Augers 25 and 26, disposed at least partially in trough 19, include a pair of laterally spaced, longitudinally disposed shafts 34 and 35 which also are journaled in the end walls of the hopper.

Figure 4:
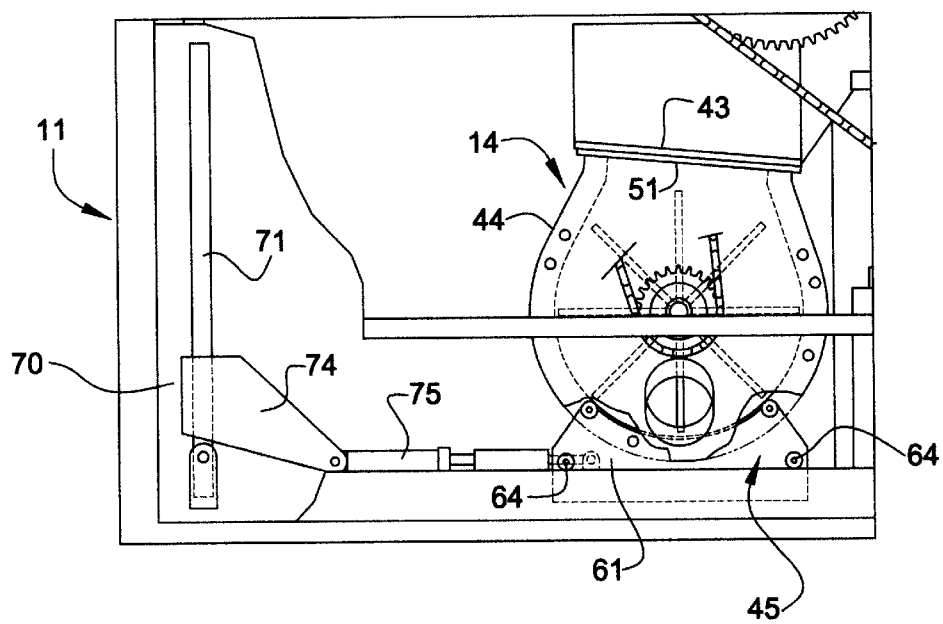
FIG. 4 is a partial view of a lower end of the embodiment shown in FIG. 1, having a portion thereof broken away and illustrating an airlock feeder in a first or operative position.
Figure 5:
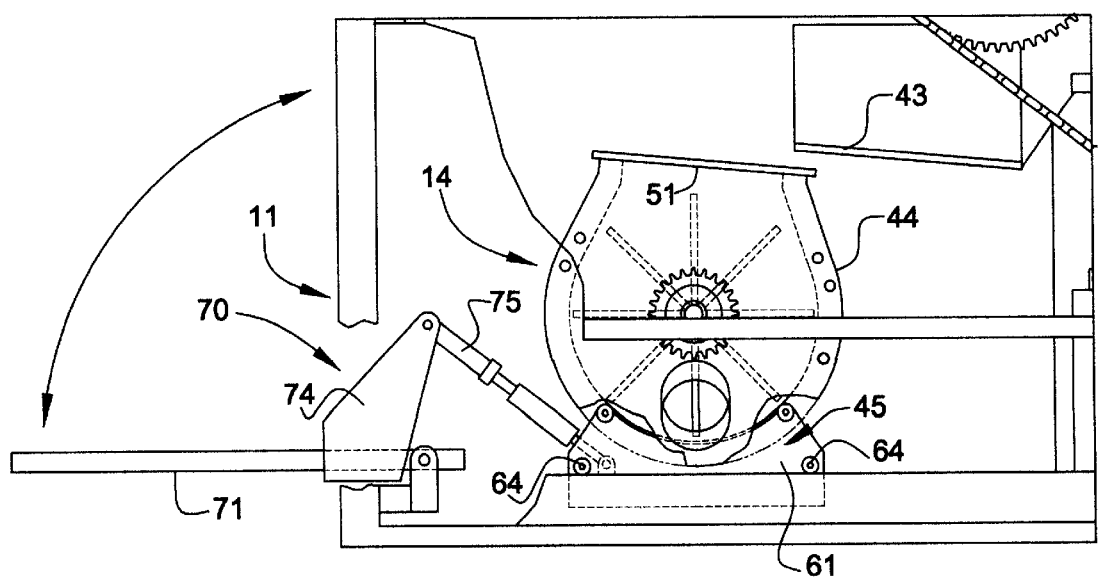
FIG. 5 is a view similar to the view shown in FIG. 4, illustrating the feeder in a second or inoperative position.
Figure 6:
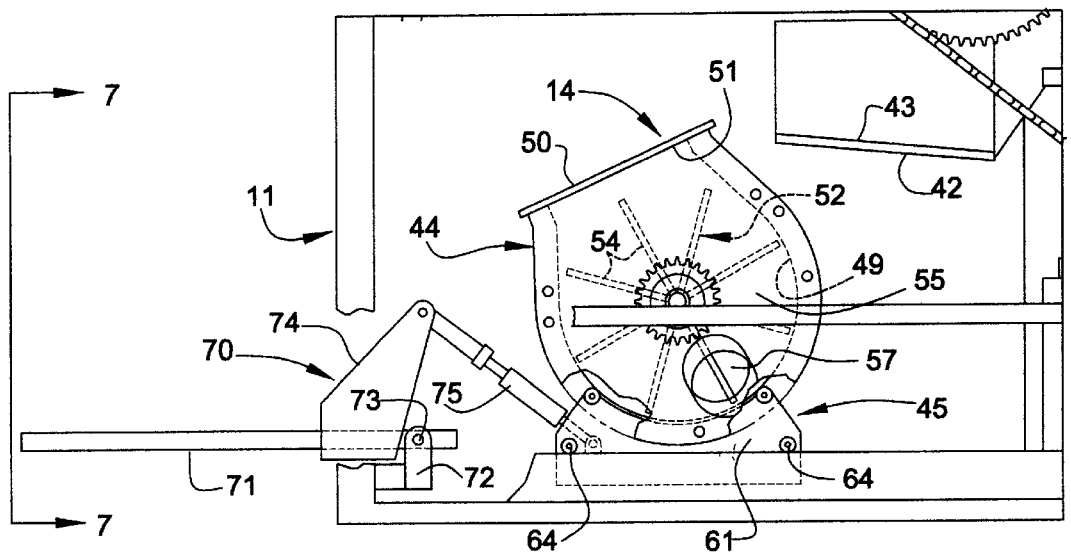
FIG. 6 is a view similar to the view shown in FIG. 5, further illustrating the feeder angularly displaced relative to a carrier on which it is supported, facilitating access to an upper seal seating surface disposed about an inlet of the feeder.
Figure 7:
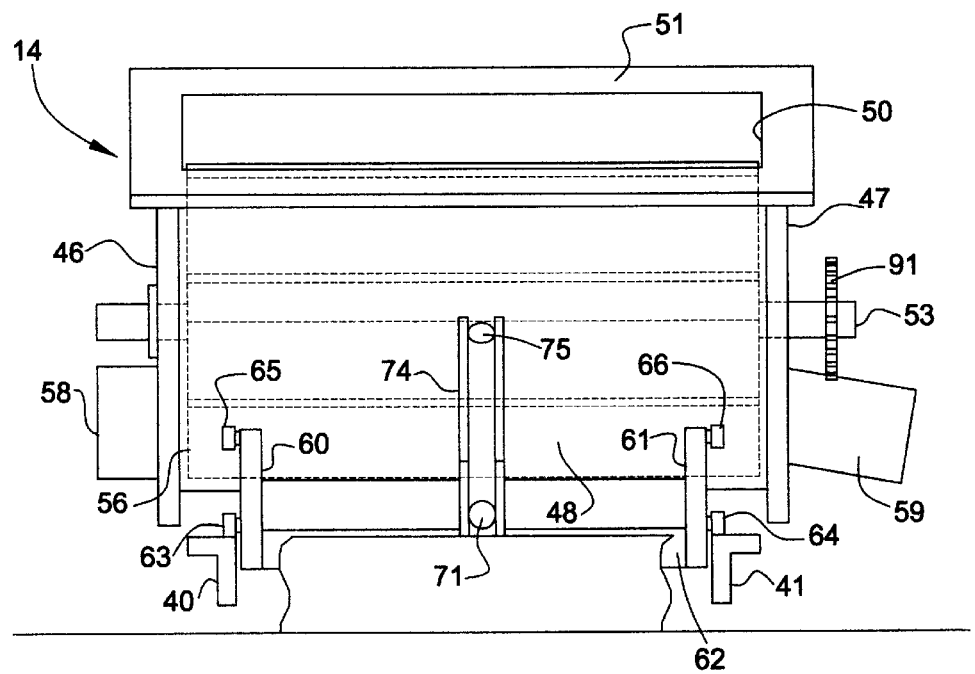
FIG. 7 is a view taken along lines 7—7 in FIG. 6.

As best shown in FIGS. 4 through 7, the bottom portion of frame 11 is provided with a pair of longitudinally spaced, transversely disposed members 40 and 41. Such members have angle-shaped cross-sectional configurations including forwardly and rearwardly projecting flanges providing upper surfaces lying in the same plane which serve as guide tracks along which airlock feeder 14 may be displaced between a first or operative position as shown in FIG. 4 and a second or inoperative position as shown in FIGS. 5 and 6. The plane of a mating surface 42 disposed on the underside of a flange 43 formed about hopper outlet 20, lies at a small angle relative to the plane of the upper surfaces of members 40 and 41 so that when feeder 14 is displaced from its second or inoperative position as shown in FIG. 5 to its first or operative position as shown in FIG. 4, it will be wedged between the upper surfaces of members 40 and 41 and mating surface 42 of the trough portion of the hopper.

Feeder 14 includes a rotor housing 44 supported on a carrier 45 which is adapted to ride along the guide tracks provided by members 40 and 41 to displace the rotor housing between operative and inoperative positions. The rotor housing includes a pair of end walls 46 and 47 interconnected by an arcuate wall 48 defining a rotor chamber 49 having a substantially cylindrical configuration with a material receiving inlet 50 adapted to communicate with hopper outlet 20 when the feeder is in its operative position as shown in FIG. 4. The inlet of housing 44 is provided with a peripheral flange 51 which is adapted to mate with flange 42 with a peripheral seal therebetween when the feeder is in its operative position. Disposed within housing 44 is rotor assembly 52 which includes a shaft 53 journaled in end walls 46 and 47 of the housing, and a plurality of circumferentially spaced, radially projecting vanes 54 providing a plurality of circumferentially spaced pockets 55. Disposed in housing end walls 46 and 47 and longitudinally aligned in the lower end of the housing, diametrically opposed to inlet opening 50, is a pair of air inlet and outlet openings 56 and 57, respectively which aligned sequentially with pockets 55. Inlet 56 is provided with a cylindrical fixture 58 to which a line connected to a compressor or other source of a supply of air under pressure may be connected, and outlet 57 is provided with cylindrical fixture 59 to which a similar line or hose may be connected for conveying shredded fiber material entrained in a stream of high pressure air, as will later more fully will be described.

Carrier 45 consists of a pair of longitudinally spaced end walls 60 and 61 interconnected at their lower ends by plate member 62. The outer, lower ends of side walls 60 and 61 are provided with sets of rollers 63 and 64 which permit the carrier to be displaced transversely along the guide tracks provided by members 40 and 41. The upper ends of end walls 60 and 61 are provided with longitudinally aligned, arcuate surfaces having a radius of curvature corresponding substantially to the radius of curvature of the lower end of the rotor housing. Carrier side walls 60 and 61 further are provided with sets of rollers 65 and 66 at the upper ends thereof adjacent the arcuate upper edges thereof on which the arcuate lower end of the rotor housing is supported. It will be appreciated that by reason of the rotor housing being supported on sets of rollers 65 and 66, the rotor housing may be caused to angularly displace relative to carrier 45 about an axis disposed coaxially with rotor 53.

Feeder 14 comprising rotor housing 44 mounted on carrier 45 may be displaced between its first or operative position as shown in FIG. 4 to its second or inoperative position as shown in FIG. 5 by means of a manually operated mechanism 70 operatively interconnecting a member of frame 11 and carrier 45. The mechanism includes an elongated handle 71 pivotally connected to a support bracket 72 of the frame by means of a pin 73, a bracket 74 mounted on handle 71 adjacent pin 73 and a linkage 75 operatively interconnecting the end of bracket 74 and base plate 62 of the carrier. It will be appreciated that when handle 71 is in an upright position as shown in FIG. 4, linkage 75 will be caused to displace the carrier and thus position the feeder in the first or operative position, and when the handle is pivoted approximately 90° as shown by the arrow in FIG. 5, the linkage will cause the carrier and thus the feeder to be displaced to the second or inoperative position as shown in FIG. 5.

Drive system 16 includes an assembly of gears driven by drive chains and meshing gears for transmitting rotary motion from the output shaft of motor 15 to the set of shredders 21 and 22, the first set of augers 23 and 24, the second set of augers 25 and 26 and rotor assembly 52. Drive is transmitted from the output shaft of motor 15 to auger shaft 35 by means of a gear 80 mounted on the motor output shaft, a gear 81 on shaft 35 and a drive chain 82 provided with a tensioner 83. Drive is transmitted from shaft 35 to shaft 28 and 33 by means of a gear 84 mounted on shaft 35, gears 85 and 86 mounted on shafts 28 and 33 and drive chain 87 provided with a tensioner 88. Drive is transmitted from shaft 35 to shaft 34 by means of a gear 89 on shaft 35 meshing with a gear (not shown) on shaft 34. Drive is transmitted from shaft 34 to rotor shaft 53 by means of a gear 90 mounted on shaft 34, a gear 91 mounted on the rotor shaft, and a drive chain 92. Drive is transmitted from shaft 34 to shaft 32 by a gear mounted on a rear end of shaft 34 (not shown), a gear 93 mounted on a rear end of shaft 32 and a drive chain (not shown), and drive is transmitted from shaft 33 to shaft 29 by means of a gear 94 mounted on a rear end of shaft 33 which meshes with a gear (not shown) mounted on a rear end of shaft 29.

With the drive system as described, it will be appreciated that shredders 21 and 22 counter rotate, the first set of pulleys 23 and 24 counter-rotate and the second set of pulleys 25 and 26 also counter rotate. From the view shown in FIG. 1, shafts 32, 29, 34 and 53 rotate in a clockwise direction and shafts 28, 33 and 35 rotate in a counterclockwise direction.

In the operation of the machine as described, when the feeder is in the position as shown in FIG. 1, feeder inlet 56 is connected to a supply of air under pressure, feeder outlet 57 is connected to a hose for transporting shredded fibrous material to a desired location and motor 15 is operated, loads of compacted fibrous material to be shredded and transported may be introduced into hopper 12 through the upper inlet opening thereof. Such material introduced into the hopper will be shredded by shredders 21 and 22 and caused to be impelled laterally toward augers 23 and 24 which then will cause such shredded material to be impelled toward augers 25 and 26 in the trough of the hopper. Counter-rotating augers 25 and 26 will then cause the shredded material to be advanced forwardly and discharged though hopper outlet 20 into the feeder through feeder inlet 50. As shredded material enters the feeder and the rotor rotates, masses of shredder material will be transported through the feeder in the pockets thereof and thus caused to be entrained in a stream of high pressure air injected through the lower end of the feeder. By the selection of a suitable operating air pressure and the increased feed rate provided by augers 25 and 26 positioned in the trough of the housing, an optimum amount of shredded fiber material is caused to be entrained in the high pressure gas stream traversing the feeder to provide a high density product emanating from the feeder. Such higher density product results not only in lower fuel requirements but higher productivity in being able to transport a greater volume of shredded material to the desired destination site in a shorter period of time.

Because air is injected at a high pressure through the lower end of the feeder and the hopper is normally operated at atmospheric pressure, it is important that an effective seal be provided between the mating portions of the hopper and the feeder. To assure such an effective seal, the feeder must periodically be detached from the hopper for the purpose of inspecting or replacing the seal. The present invention provides a simple and expeditious means for detaching the feeder, replacing a seal and reattaching the feeder to the hopper. This is accomplished simply by removing a few fasteners securing upper flange 51 of the rotor housing to flange 43 on the lower end of the hopper, pulling the handle down in the direction of one of the arrows as shown in FIG. 5 to cause the carrier to displace the rotor housing from the operative to the inoperative position, and then pivoting the rotor housing relative to the carrier substantially about the axis of the rotor to a position as shown in FIG. 6, to position seal surface 50 and thus provide easy access for inspecting the seal and possibly removing the old seal and replacing it with a new seal. The feeder may then be reattached to the hopper simply by angularly adjusting the rotor housing to a position as shown in FIG. 5, pivoting handle 71 upwardly to the position shown in FIG. 1 thus causing the feeder to be positioned as shown in FIG. 4, and then fastening the upper end of the rotor housing to the lower end of the hopper. As the feeder is displaced from the inoperative to the operative position, the angle of the plane of mating surface 42 will cause the feeder to be wedged between frame members 40 and 41 and the lower end of the hopper as the surface of flange 51 of the rotor housing engages flange surface 42 of the lower end of the hopper, with the seal being disposed and compressed therebetween. In the event the upper mating surface of the rotor housing is not precisely aligned relative to the mating surface of the lower end of the hopper as the feeder is displaced from the inoperative to the operative position, the manner of support of the rotor housing on the carrier will permit the rotor housing to rotate and thus properly align itself for connection to the hopper in its operative position. The detached mounting of the rotor housing also permits such housing to be removed from the machine for cleaning, repair or general maintenance.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A machine for separating a compacted fibrous material and pneumatically impelling separated fibrous material comprising:

a hopper having a trough at a lower end thereof, said trough having an outlet;

a pair of augers disposed in said trough operable to advance separated fibrous material toward said outlet;

means disposed in said hopper between an inlet of said hopper and said trough for shredding compacted fibrous material introduced into said hopper;

an airlock feeder having an inlet communicating with said trough outlet;

a motor; and means for conveying drive from said motor to said shredding means, said augers and said feeder.

2. A machine according to claim 1 wherein said hopper includes a pair of laterally spaced side walls converging toward said trough.

3. A machine according to claim 1 wherein said augers are counter-rotating.

4. A machine according to claim 3 wherein said augers are operable to advance said separated fibrous material toward a bottom wall including said outlet.

5. A machine according to claim 3 wherein said augers are journalled in end walls of said hopper.

6. A machine according to claim 1 wherein said feeder includes a rotor provided with a plurality of circumferentially spaced pockets each communicable in a first position with said trough outlet for receiving separated fibrous material therethrough and communicable in a second position with an inlet of said feeder communicable with a source of air under pressure and with an outlet of said feeder.

7. A machine according to claim 1 wherein said shredding means comprises a pair of rotatable shafts, each having a plurality of outwardly projecting arm members.

8. A machine according to claim 7 wherein said shafts of said shredding means are journaled in a pair of end walls of said hopper.

9. A machine according to claim 7 wherein said arm members are provided with a cruciform configuration.

10. A machine according to claim 7 wherein said shafts of said shredding means are counter-rotating.

11. A machine according to claim 7 wherein said pair of augers counter-rotate and said shafts of said shredding means counter-rotate in directions opposite the directions of counter-rotation of said pair of augers.

12. A machine according to claim 1 including a second pair of augers each disposed between said shredding means and a side wall of said hopper.

13. A machine according to claim 12 wherein said second pair of augers are journaled in end walls of said hopper.

14. A machine according to claim 13 wherein said first pair of augers counter-rotate and said second pair of augers counter-rotate in the same direction as said first pair of augers.

15. A machine according to claim 1 wherein said feeder is readily displaceable between a first position operable to receive shredded fiber material through said trough outlet and a second position.

16. A machine according to claim 15 wherein said feeder is wedge fit into said first position between said hopper and a surface.

17. A machine according to claim 15 including means for displacing said feeder between said first and second positions.

18. A machine according to claim 16 including a frame and wherein said hopper is mounted on said frame and said surface is disposed on said frame.

19. A machine according to claim 18 including means mounted on said frame and operatively connected to said feeder for displacing said feeder between said first and second positions.

20. A machine according to claim 19 wherein said displacing means includes a manually operated handle pivotally connected to said frame and a linkage operatively interconnecting said handle and said feeder.

21. A machine according to claim 15 wherein said feeder is mounted on a carrier and is angularly displaceable relative to said carrier about an axis.

22. A machine according to claim 21 wherein said carrier with said feeder mounted thereon are wedge fit into said first position between said hopper and a surface.

23. A machine according to claim 21 including means for displacing said feeder between said first and second positions.

24. A machine according to claim 21 wherein said carrier is supported on said surface on a set of rollers.

25. A machine according to claim 21 wherein said feeder is supported on said carrier on a set of rollers.

26. A machine according to claim 21 including a frame and wherein said hopper is mounted on said frame and said surfaces disposed on said frame.

27. A machine according to claim 26 including means mounted on said frame and operatively connected to said carrier for displacing said feeder mounted on said carrier between said first and second positions.

28. A machine according to claim 27 wherein said displacing means includes a manually operated handle pivotally connected to said frame and a linkage operatively interconnecting said handle and said carrier.

29. A machine according to claim 1 wherein said feeder is displaceable along a linear line of travel and wherein said feeder mates with said hopper along a plane disposed at an angle relative to said line of travel.

30. A machine according to claim 29 including means for displacing said feeder along said line of travel between said first and second positions.

31. A machine according to claim 29 including a frame and wherein said hopper is mounted on said frame and said feeder is displaceable along a guide track mounted on said frame.

32. A machine according to claim 31 including means mounted on said frame and operatively connected to said feeder for displacing said feeder along said line of travel between said first and second positions.

33. A machine according to claim 32 wherein said displacing means includes a manually operated handle pivotally connected to said frame and a linkage interconnecting said handle and said carrier.

34. A machine according to claim 29 wherein said feeder is mounted on a carrier and is angularly displaceable relative to said carrier about an axis disposed at a right angle to said line of travel.

35. A machine according to claim 34 wherein said axis is coaxial with a rotor of said feeder.

36. A machine according to claim 34 wherein said carrier with said feeder mounted thereon become wedge fit between a guide track and said hopper when said feeder is in said first position.

37. A machine according to claim 34 including means for displacing said feeder along said line of travel between said first and second positions.

38. A machine according to claim 34 including a frame and wherein said hopper is mounted on said frame and said feeder is displaceable along a guide track mounted on said frame.

39. A machine according to claim 38 including means mounted on said frame and operatively connected to said feeder for displacing said feeder along said line of travel between said first and second positions.

40. A machine according to claim 39 wherein said displacing means includes a manually operated handle pivotally connected to said frame and a linkage interconnecting said handle and said feeder.

* * * * *

UNITED STATES PATENT AND TRADEMARK OFFICE
CERTIFICATE OF CORRECTION

PATENT NO.     : 6,572,038 B2
DATED          : June 3, 2003
INVENTOR(S)    : Jack D. Coulter et al.

It is certified that error appears in the above-identified patent and that said Letters Patent is hereby corrected as shown below:

Column 8,
Line 3, please delete "claim 1" and insert "claim 15" in lieu thereof.

Signed and Sealed this

Fourth Day of November, 2003

JAMES E. ROGAN
*Director of the United States Patent and Trademark Office*